US012455262B2

(12) United States Patent
Fernández Díaz et al.

(10) Patent No.: US 12,455,262 B2
(45) Date of Patent: Oct. 28, 2025

(54) METHOD AND DEVICE FOR CHARACTERISING THE RESPONSE OF RESONANT SENSORS

(71) Applicants: UNIVERSIDAD POLITECNICA DE VALENCIA, Valencia (ES); ADVANCED WAVE SENSORS, S.L., Paterna (ES)

(72) Inventors: Román Fernández Díaz, Picanya (ES); Maria Calero Alcarria, Castellón de la Plana (ES); José Vicente García Narbón, Burjassot (ES); Yolanda Jimenez Jimenez, Valencia (ES); Antonio Arnau Vives, Valencia (ES)

(73) Assignees: UNIVERSIDAD POLITECNICA DE VALENCIA, Valencia (ES); ADVANCED WAVE SENSORS, S.L., Paterna (ES)

( * ) Notice: Subject to any disclaimer, the term of this patent is extended or adjusted under 35 U.S.C. 154(b) by 323 days.

(21) Appl. No.: 18/007,330

(22) PCT Filed: Jul. 14, 2021

(86) PCT No.: PCT/ES2021/070518
§ 371 (c)(1),
(2) Date: Jan. 30, 2023

(87) PCT Pub. No.: WO2022/023598
PCT Pub. Date: Feb. 3, 2022

(65) Prior Publication Data
US 2023/0296565 A1 Sep. 21, 2023

(30) Foreign Application Priority Data
Jul. 30, 2020 (ES) .............................. ES202030810

(51) Int. Cl.
*G01N 29/036* (2006.01)
*G01N 29/44* (2006.01)

(52) U.S. Cl.
CPC ....... *G01N 29/036* (2013.01); *G01N 29/4418* (2013.01)

(58) Field of Classification Search
CPC ............ G01N 29/036; G01N 29/4418; G01N 29/028; G01N 29/4472; G01N 29/022
See application file for complete search history.

(56) References Cited

U.S. PATENT DOCUMENTS 8,869,617 B2 * 10/2014 Arnau Vives ............ G01N 5/02
73/579
2012/0152003 A1 * 6/2012 Arnau Vives ........ G01N 29/222
73/61.49

(Continued)

FOREIGN PATENT DOCUMENTS

WO     2008114003 A1     9/2008

OTHER PUBLICATIONS

International Search Report issued on Oct. 28, 2021, in corresponding International Application No. PCT/ES2021/070518, 6 pages.

(Continued)

*Primary Examiner* — Xin Y Zhong
(74) *Attorney, Agent, or Firm* — Maier & Maier, PLLC

(57) ABSTRACT

A method and device for characterizing the response of resonant sensors. The method is based on an analytic algorithm that establishes a relationship between the complex admittance G of the sensor, measured at a single test frequency, the variations in resonance frequency and the losses, such as the quality factor at the acoustic resonator. The device includes at least one piezoelectric resonator on whose surface is deposited a thin layer of material, a fluid medium in contact therewith, a stable signal source, a (Continued)

frequency synthesis subsystem, a multiplex subsystem that enables the excitation/interrogation of a particular resonator, a signal conditioning and acquisition subsystem, a control subsystem based on the use of digital integrated circuits enabling the coordinated control of the different subsystems that make up the device.

10 Claims, 5 Drawing Sheets

(56) References Cited

U.S. PATENT DOCUMENTS

2018/0172640 A1\* 6/2018 Besse .................... G01N 29/028
2020/0355073 A1\* 11/2020 Maity ................... G01N 29/036

OTHER PUBLICATIONS

Amer et al., "Multichannel QCM-Based System for Continuous Monitoring of Bacterial Biofilm Growth", IEEE Transactions on Instrumentation and Measurement, 2020, vol. 69, No. 6, pp. 2982-2995.

\* cited by examiner

METHOD AND DEVICE FOR CHARACTERISING THE RESPONSE OF RESONANT SENSORS

FIELD

The present invention relates to an electronic characterization method for determining the response of one or more harmonic modes vibrating in one or more acoustic sensors based on the principle of resonance such as piezoelectric, optical. The characterization method is fast and accurate.

BACKGROUND

Acoustic sensors, including those based on piezoelectric quartz crystals, are devices used to accurately measure both variations in mass per unit area and the viscoelastic properties and conformational changes of the media deposited on them, through the changes suffered by the complex resonance frequency of these crystals operating as resonators.

The principle of the quartz AT resonator as a quartz microbalance, better known by its acronym QCM (QuartzCrystalMicrobalance), was established by Sauerbrey in 1959. Sauerbrey's equation states that the decrease in resonant frequency of the resonator is proportional to the increase in the surface mass density of the coating on the sensor surface. The field of application of the sensor is extended in liquid media. Kanazawa in 1985 establishes the relationship between the resonant frequency shift of the resonator and the properties of the fluid in contact. Subsequently it is shown that the measurement of the oscillation amplitude at the resonance frequency provides more information about the physical processes occurring on a layer of material of given thickness in contact on the resonator. The measurement of at least one of these parameters: resonance frequency and amplitude, has been and continues to be used in a multitude of applications where the AT quartz resonator is used as a quartz microbalance sensor, QCM.

Although the impact of QCM technology is growing, there are still many challenges that must be faced and solved in order for this technology to have practical and competitive applicability in sectors such as medical diagnostics, food safety or environmental diagnostics. Among the most relevant challenges, performance is a key aspect to be improved in order to compete with other analytical techniques. Most commercial QCM systems are based on the use of single sensors or multichannel systems composed of several independent sensors. To improve performance it is necessary to work along two different lines:
1) the integration of numerous QCM sensors on the same substrate composing an array, and
2) the development of a high speed and high precision electronic characterization system that allows the characterization of the response of the array during the course of the experimental process.

The implementation of an array of QCM sensors sharing substrate is possible due to its high integration capability, giving rise to the so-called Monolithic QCM, MQCM, Monolithic QCM in its acronym in English. In addition to improved performance, the use of MQCM technology offers other benefits such as a reduction in size and therefore in the manufacturing cost and volume of reagents required for the experimental process. Another pending challenge for QCM technology is related to the analysis and interpretation of the results. In this sense, a particularity of QCM sensors lies in the fact that in a single sensor there are numerous vibration modes coincident with the odd harmonics of the fundamental shear mode. Consequently, the simultaneous monitoring of all these modes during an experimental process allows us to obtain more information about what is happening on the sensor surface. Indeed, the higher order harmonics provide greater detail of what is happening in the vicinity of the sensor surface, while the lower order harmonics include the effects produced at positions farther away from the surface. Some works based on the measurement of multiple harmonics are, for example, those that study structural transformations of lipid membranes or the formation of aggregates in mesoporous nano-containers.

QCM sensor systems operating in multi-harmonic mode require high speed characterization of these. Another desirable requirement is the ability to provide data in the form of variations of frequency, $\Delta f$, and dissipation factor, $\Delta D$ or $\Delta \Gamma$. The reason is that most of the existing state-of-the-art physical models used for the analysis and interpretation of QCM experimental data relate $\Delta fy \Delta \Gamma$ to the physical and/or biochemical properties of the materials deposited on the sensor.

In conclusion, the possibility of extending QCM technology to applications of interest, both for the practical needs they cover and for the potential market volume they affect, and which require characterizing a large number of sensors, sensor arrays, and/or their harmonics, is conditioned by the existence of new characterization methods that allow obtaining measurements of the frequency variations, $\Delta f$, and of the dissipation factor, $\Delta D$ or $\Delta \Gamma$, in a faster and more accurate way. In the specific case of sensor arrays, it is also necessary that new measurement methods consider the electrical artifacts that can result from the integration of numerous sensors and their electrical connections in a reduced surface area. Finally, it would be desirable that the computational resources required to implement the characterization method be reduced in terms of computational power and memory in order to optimize the cost, size and autonomy of the devices implementing such a method.

The methods used in the state of the art to characterize piezoelectric resonators in QCM applications can be classified into two types: a) those that passively interrogate the sensor that remains external to the characterization system, and b) those in which the sensor is part of the characterization system itself. The first group includes network or impedance analyzers and decay techniques, while the second group includes oscillators and phase-locking techniques.

Network/impedance analyzers are used to determine the resonator admittance spectrum in the near-resonant frequency range. It is possible to extract resonator parameters such as series and parallel resonance frequencies and dissipation factor by fitting this spectrum to a parametric model of the resonator. The advantages of network or impedance analyzers are recognized and are associated with the fact that the sensor can be characterized after a calibration in which any electrical influence external to the sensor itself has been compensated for. On the other hand, decay methods are based on the temporal processing of the attenuation that the resonator vibration amplitude undergoes when the signal with which it has been excited is interrupted for a certain time at a frequency close to the resonance frequency. This analysis finally provides information on the variation of the resonance frequency, series or parallel depending on the configuration, and the losses in the resonator. The accuracy of this method is high, provided that the decay signal acquisition accuracy is high, both in phase and amplitude, which is complex for high frequency resonators. Therefore, for high frequency resonators, higher than 50 MHz, only impedance analyzers are sufficiently accurate, but their high cost and dimensions make them unsuitable for sensor applications. Also, both methods require the acquisition of a large number of points of the spectrum or decay signal in order to characterize the sensor response. This fact limits the sampling frequency of the magnitudes of interest, resonance frequency and dissipation, discouraging the application of these techniques in processes in which there is a rapid temporal variation of the sensor response, either in the characterization of multiple harmonics or multiple sensors simultaneously.

In oscillator-based techniques the resonant sensor is used as an oscillation frequency control element, allowing continuous tracking of a frequency that corresponds to a specific phase of the resonator in the resonance range. This frequency can be used in many applications as the resonant frequency characteristic of the resonator. Oscillator-based techniques are the simplest and fastest in frequency tracking, but are not useful for characterizing sensor dissipation.

In addition, they have operating disadvantages in liquid media, where many applications of great interest take place; therefore, great efforts have been made in the design of oscillators suitable for these applications that can be considered as sophisticated oscillators, in the sense that they include a feedback loop, where the excitation source of the sensor can be considered external to the sensor and where the loop feedback condition can be precisely calibrated. These techniques allow the dynamic series resonance frequency of the resonator to be accurately monitored and some of them have been patent protected.

In phase-locking techniques the resonator is also part of a feedback circuit, similar to an oscillator, which sets the lock-in frequency. However, unlike oscillators, in these methods the effects external to the resonator can be simply calibrated out, providing systems where the resonator is passively interrogated, similar to the case of impedance analyzers, but resulting in simpler and more compact circuits at reduced cost.

An alternative approach would be to interrogate the sensor with a test signal (called a test signal) from an external source of high frequency and phase stability, similar to impedance or network analyzers, but at a fixed frequency within the resonance band of the sensor. A change in the phase-frequency response of the resonator would be detected from the phase shift of the test signal.

U.S. Pat. No. 8,869,617B2 granted to Arnau et al. claims a method and system based on this idea, however, it suffers from the following problems:

The method described in patent U.S. Pat. No. 8,869,617B2 is based on a simple mathematical approximation, which is only valid for very specific cases in which it is assumed that the slope of the phase-frequency response of the sensor remains unchanged during the measurement. This significantly limits the applicability of the method. The system object of the present invention takes into account this aspect, which results from a rigorous analysis of the problem and, consequently, is not the result of a simple or trivial modification of the system shown in the previous patent.

The method described in patent U.S. Pat. No. 8,869,617B2 allows only to characterize the transfer, accumulation or loss of mass on a coating deposited on a piezoelectric resonator acting as a sensor. Therefore, the method is not prepared to measure the losses, quality factor, in the sensor. This causes it to provide inaccurate results in most applications where high accuracy is required, making it inapplicable in practice. The system subject of the present invention takes into account this aspect, which results from a rigorous analysis of the problem and, consequently, is not the result of a simple or trivial modification of the system shown in the previous patent.

The method described in patent U.S. Pat. No. 8,869,617B2 also does not consider the electrical artifacts that may result from a complex electronic interface connecting to the sensor or sensor array. These artifacts could lead to errors in the measurement of $\Delta f$ and $\Delta \Gamma$. This fact limits the applicability of the method. The system subject of the present invention takes into account this aspect, which results from a rigorous analysis of the problem and, consequently, is not the result of a simple or trivial modification of the system shown in the previous patent.

ArnabGuha et al also propose a similar method based on the assumption that the characteristic impedance of the QCM resonator remains constant during the experimental process if the changes in resonant frequency are small. This assumption implies a considerable error in the estimation of the sensor parameters of interest. Also, the method also does not consider possible electrical artifacts in the measurement and assumes that the selection of the test frequency can be made over a very wide range of frequencies. All this leads to very large errors in the characterization of the acoustic resonator which makes the method inapplicable in practice.

SUMMARY

The present invention seeks to solve one or more of the drawbacks set forth above by means of a method for characterizing the response of resonant sensors as defined in the claims.

The method for characterizing the response of resonant sensors is based on at least one analytical algorithm that establishes a relationship between the complex admittance of the sensor measured at a single test frequency with the variations of the resonant frequency and losses, namely quality factor in the acoustic resonator.

The method provides a fast and accurate way to characterize a chemical or physical process whose result can be evaluated in terms of mass variation and/or modification of the geometrical, hydrodynamic or visco-elastic properties of a coating deposited on a piezoelectric sensor confronted with a fluid or gaseous medium whose physical characteristics may or may not remain stable.

The proposed method is valid for any sensor, whether acoustic, optical, etc., which presents a resonant response adjustable to a Lorentzian curve and which is sensitive to given external parameters.

It is also an object of the present invention to provide a method and system which supports the incorporation of sensors in oscillator circuits.

The method and system make it possible to establish the optimum frequency of the test signal used to interrogate the resonant sensor in real time during monitoring of the experimental process of interest thereby avoiding saturation in the response of the resonant sensor.

The method provides a fast and accurate procedure for the simultaneous characterization of an array of QCM sensors integrated on a monolithic substrate.

The method rapidly characterizes different resonant harmonic modes in the same acoustic sensor, whether or not integrated in an array of MQCM sensors, during an experimental process.

The method makes it possible to determine and exclude from the measurement of the sensor response electrical artifacts due to external constraints.

The method characterizes the resonant response of a sensor, the resonant frequency and the losses or Quality factor.

The method comprises the following steps:
1.—Measurement of the values of the real part, conductance, and the imaginary part, susceptance, of the electrical admittance of the sensor in a frequency range close to the resonant mode of interest,
2.—Performing a nonlinear numerical fitting of the complex admittance spectrum obtained in the previous stage to a Lorentzian curve that models the resonant response of the sensor in order to obtain a set of parameters that represent the initial response of the sensor, among them the dynamic series resonance frequency,
3.—Selection of a frequency for the test signal substantially equal, understood as a frequency equal or very close to the dynamic resonance frequency of the resonator in the state considered as a reference,
4.—Measurement of the values of the real part, conductance, and the imaginary part, susceptance, of the electrical admittance of the sensor only at the test frequency,
5.—Application of at least one algorithm to calculate the variation in the resonance frequency and in the dissipation factor of the sensor from the electrical admittance values measured at a single frequency in the previous point, and
6.—Updating the value of the frequency of the test signal as a previous step to a new measurement of the electrical admittance of the sensor.

BRIEF DESCRIPTION OF THE FIGURES

A more detailed explanation of the invention is given in the description which follows and which is based on the attached figures.

DETAILED DESCRIPTION

Referring to FIGS. 1 to 5, the characterization method is based on the application of the Butterworth-Van-Dyke equivalent circuit, BVD, which electrically models the response of a QCM sensor by means of discrete electrical elements.

This model adequately represents the electrical admittance of the resonator when it vibrates in the vicinity of the natural resonance frequency of one of its eigenmodes.

Figure 1:
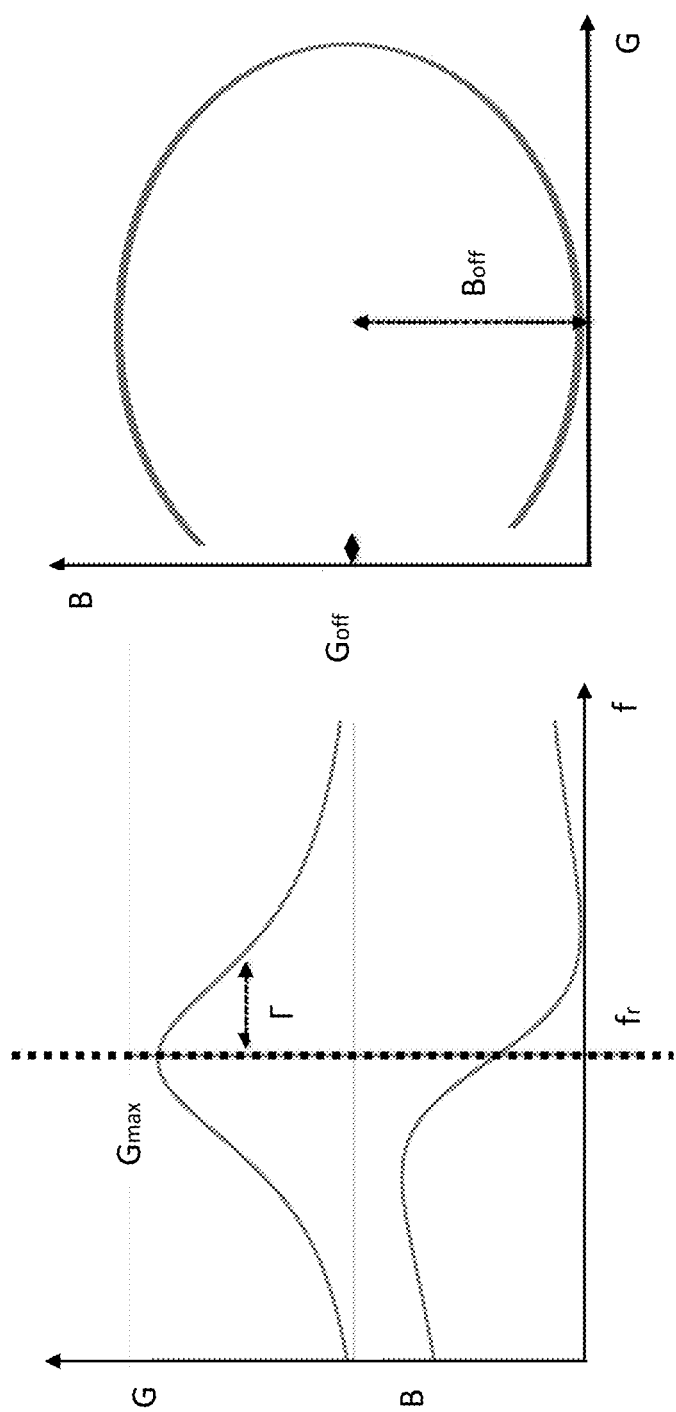
FIG. 1 shows in a schematic the physical meaning of the parameters of the Lorentzian model employed.
Figure 2:
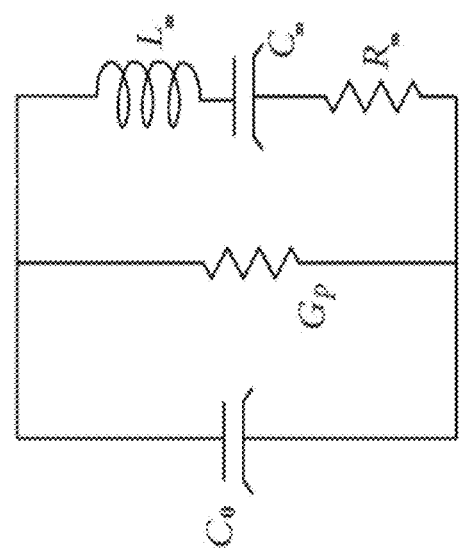
FIG. 2 shows a schematic of a BVD circuit used to characterize a resonator.

As can be seen in FIG. 2, the BVD equivalent circuit comprises two branches: the first is known as the "static branch" and is formed by the capacitor $C_0$, which is associated with the electrical capacitance formed by the resonator electrodes with the dielectric material, usually quartz, that forms the resonator substrate between them, and the second branch is known as the "dynamic branch" and is formed by a series circuit containing a resistor, a coil and a capacitor that model the dynamic behavior of the sensor.

The model in FIG. 2 contains a third branch formed by a conductance that is usually added to the equivalent BVD circuit. This branch takes into account the increase of the average conductance in the sensor as the frequency increases.

Each of the electrical elements of the dynamic branch of the sensor is related in some way to the mechanical properties of the sensor. The electrical resistance $R_m$ models the losses due to viscous effects. The inductive parameter $L_m$ is proportional to the surface mass density and models the energy stored in the resonator due to the inertial effect. Finally, the capacitive parameter $C_m$ is proportional to the elastic energy stored in the sensor. Changes in the sensor load can be incorporated directly into the equivalent circuit as changes in the discrete electrical elements in the "dynamic branch".

If the Small Load Approximation, SLA, is applied, a simple relationship is found to exist between the acoustic load impedance and variations in the dynamic series resonance frequency and dissipation factor in the sensor. This relationship is sufficiently accurate in practice provided that the ratio between the mechanical impedance of the surface load on the resonator and the characteristic impedance of the resonator substrate, usually quartz, does not exceed a value of 0.1.

The SLA approach is crucial for the interpretation of the data provided by QCM technology. The vast majority of experiments and surface interactions such as DNA hybridization, immunoassays, protein conformational studies, etc., can be adequately described by such an approach. Moreover, this is so even considering that variations in the acoustic load impedance of the sensor are due exclusively to changes in the inductive $L_m$ and resistive $R_m$ parameters of the dynamic branch while the dynamic capacitance $C_m$ and the static capacitance $C_0$ remain unchanged.

From an initial estimate of the complete set of sensor BVD model parameters $L_m$, $C_m$, $R_m$ and $C_0$, and assuming that the parameters $C_m$ and $C_0$ will not vary during the experiment, it is possible to extract the variations in both the resonant frequency $\Delta f$ and the dissipation factor $\Delta D$ of the sensor from the changes in the real and imaginary parts of the electrical admittance measured at a fixed test frequency. From the set of equations the complex admittance of the sensor predicted by the BVD equivalent circuit is presented in equation (1):

$$Y_x = G(\omega_t) + j\beta(\omega_t) = [R_m/(R_m^2 + X_m^2)] + j\omega_t C_0 - j[X_m/(R_m^2 + X_m^2)] \quad (1)$$

Where $\omega_t$ is the test angular frequency at which the admittance is measured, G is the conductance, B is the susceptance and $X_m$ is defined as:

$$X_m = L_m \omega_t - [1/(C_m \omega_t)] \quad (2)$$

By separating the real and imaginary part in (1) and rearranging terms, we obtain equations (3) and (4)

$$G(\omega t) = 1/[R_m(1+(X_m^2/R_m^2))] \quad (3)$$

$$B(\omega_t) = \omega_t C_0 - [(X_m/R_m)/[R_m(1+(X_m^2/R_m^2)]] \quad (4)$$

Operating with (3) and (4), it is possible to obtain the relation (5):

$$(X_m/R_m) = (\omega_t C_0 - B(\omega_t))/G(\omega_t) \quad (5)$$

Substituting (5) into (3) leads to equation (6) which allows estimating the changes in resistance associated with losses in the sensor from the admittance measurement at the test frequency Ot. The value of C0 is considered constant and is calculated in a previous step that will be described later.

$$R_m = 1/[G(\omega_t)[1+(\omega_t C_0 - B(\omega_t))^2/G(\omega_t)^2]] \quad (6)$$

Combining equations (2) and (5) and clearing $L_m$, equation (7) is obtained.

$$L_m = (R_m/\omega_t)[(\omega_t C_0 - B(\omega_t))/G(\omega_t)] + 1/(\omega_t C_m) \quad (7)$$

Finally, the dynamic series resonance $f_r$, which corresponds to the maximum conductance, $f_{Gmax}$, in the BVD model can be calculated from the well-known equation (8). $L_m$ is obtained from equation (7) while $C_m$ is considered constant and its value is calculated in a previous step that will be described later.

$$f_r = 1/(2\pi\sqrt{L_m C_m}) \quad (8)$$

It is noted that the calculation of the dissipation factor from the direct $L_m$ and $R_m$ values by applying the BVD model relationship:

$$D = 1/Q = R_m/(2\pi f_r L_m) \quad (9)$$

Equations (8) and (6) can be applied to estimate respectively the resistance and resonant frequency values of a QCM sensor in real time from the sensor complex admittance monitored at a single frequency. Equation (9) can alternatively be used instead of equation (6) to estimate the losses in the sensor through the dissipation factor.

The steps defining the characterization method are detailed below:

STAGE 1: Obtain the frequency spectrum of the complex electrical admittance of the acoustic resonator. For example, acquire a certain number of points, for example 100, equi-spaced in the −3 dB bandwidth around the resonant mode to be analyzed.

STAGE 2: Employ a nonlinear mathematical fitting algorithm, e.g., Nelder-Mead Simplex, to fit the experimental data of the admittance spectrum obtained in STEP 1, associated to the sensor response, to a Lorentzian model (Equations (10) and (11)) and extract the 6 parameters described below:

$$G(f) = G_{max}\left(\frac{f^2(2\Gamma)^2}{(f_r^2 - f^2)^2 + f^2(2\Gamma)^2}\cos\phi - \frac{f(2\Gamma)(f_r^2 - f^2)}{(f_r^2 - f^2)^2 + f^2(2\Gamma)^2}\sin\phi\right) + G_{off} \quad (10)$$

$$B(f) = G_{max}\left(\frac{f^2(2\Gamma)^2}{(f_r^2 - f^2)^2 + f^2(2\Gamma)^2}\sin\phi + \frac{f(2\Gamma)(f_r^2 - f^2)}{(f_r^2 - f^2)^2 + f^2(2\Gamma)^2}\cos\phi\right) + B_{off} \quad (11)$$

where, $f_r$ is the dynamic series resonance frequency,
$G_{max}$, is the maximum of the conductance,
$G_{off}$, is the conductance offset level,
$B_{off}$, is the offset level of the susceptance,
$\Gamma$, is the half bandwidth of the resonance curve. This parameter is inversely related to the dissipation factor in the sensor, and
$\phi$ is an angle that takes into account the small slopes that may appear in the resonance curve when plotted in the complex plane.

And determine the values of the equivalent circuit BVD from equations (12), (13), (14) and (15):

$$R_m = 1/G_{max} \quad (12)$$

$$L_m = R_m/4\pi\Gamma \quad (13)$$

$$C_m = 1/4\pi^2 f_r^2 L_m \quad (14)$$

$$C_0 = B_{off}/2\pi f_r \quad (15)$$

This procedure finally allows the obtaining of the parameters $C_m$, $L_m$, $R_m$ and $C_0$ that best represent the initial response of the sensor. In this way, the method takes into account any possible distortion or electrical artifacts affecting the admittance spectrum of the sensor. The $C_m$ and $C_0$ parameters obtained at this stage will be considered invariant during the experiment, thus assuming that, if any, electrical artifacts that modify the sensor response also do not change during the experiment.

It should be noted that not only the curve corresponding to the real part of the admittance, conductance of the sensor, is fitted, but the curve of the imaginary part, susceptance, is also used in the fitting. Both equations are used simultaneously to extract the 6 parameters of the Lorentzian curve chosen to model the resonant response of the resonator.

STAGE 3: Select the test frequency within the −3 dB bandwidth around the resonant frequency of the mode of interest, i.e., the frequency of maximum conductance ($f_{Gmax}$), at which the electrical admittance of the sensor will be measured.

STAGE 4: Measure the values of the real and imaginary part of the sensor ($G(\omega_t)$ and $B \omega_t$)) at the test frequency $\omega_t$.

STAGE 5: Use equations (6), (7), (8) and (9) in real time to calculate the dissipation fry values (D and $R_m$) from the admittance (G ($\omega_t$) and B ($\omega_t$)) measured at the test frequency ($\omega_t$) in STAGE 4 and from the BVD equivalent circuit parameters extracted in stage 2 ($C_m$ y $C_0$).

STAGE 6: Update the test frequency $f_r$ at which the sensor is excited and the value of the parameter $R_m$ from the new values obtained in stage 5.

STAGE 7: Rerun the process from STAGE 4 until the experiment is finished.

It is important to underline that stages 1, 2 and 3 of the method, which include the initial numerical adjustment, are only executed once at the beginning. Therefore, only stages 4, 5, 6 and 7 are performed continuously during the measurement, resulting in a very fast characterization method when compared to methods based on impedance spectrometry or the decay method.

The proposed method takes into account the case that the $C_m$ and $C_0$ values cannot be considered constant during the course of the experiment. In this situation, the proposed characterization method allows to detect and monitor the variations in the 6 parameters of the Lorentzian model by measuring the complex electrical admittance of the sensor at three different frequencies.

Indeed, by applying differential calculus, it is possible to pose a system of equations as described in (16). In this system of equations the experimental variations of the real and imaginary parts of the complex admittance of the sensor, measured at three different test frequencies f1, f2, f3, are equated to the sum of the products of the first order partial derivatives of the admittance with respect to each of the 6 parameters that are part of the model by the variations of these parameters. From this system of equations, it is possible to construct a 6×6 matrix that allows to extract the variations in the model parameters, the unknowns, from the known experimental admittance data and from the numerical calculation of the partial derivatives of the expressions for conductance (10) and susceptance (11).

$$\Delta G(f_1) = \frac{\partial G(f_1)}{\partial f_r}\Delta f_r + \frac{\partial G(f_1)}{\partial G_{max}}\Delta G_{max} +$$
$$\frac{\partial G(f_1)}{\partial \Gamma}\Delta\Gamma + \frac{\partial G(f_1)}{\partial \phi}\Delta\phi + \frac{\partial G(f_1)}{\partial G_{off}}\Delta G_{off} + \frac{\partial G(f_1)}{\partial B_{off}}\Delta B_{off}$$

$$\Delta B(f_1) = \frac{\partial B(f_1)}{\partial f_r}\Delta f_r + \frac{\partial B(f_1)}{\partial G_{max}}\Delta G_{max} +$$
$$\frac{\partial B(f_1)}{\partial \Gamma}\Delta\Gamma + \frac{\partial B(f_1)}{\partial \phi}\Delta\phi + \frac{\partial B(f_1)}{\partial G_{off}}\Delta G_{off} + \frac{\partial B(f_1)}{\partial B_{off}}\Delta B_{off}$$

$$\Delta G(f_2) = \frac{\partial G(f_2)}{\partial f_r}\Delta f_r + \frac{\partial G(f_2)}{\partial G_{max}}\Delta G_{max} +$$
$$\frac{\partial G(f_2)}{\partial \Gamma}\Delta\Gamma + \frac{\partial G(f_2)}{\partial \phi}\Delta\phi + \frac{\partial G(f_2)}{\partial G_{off}}\Delta G_{off} + \frac{\partial G(f_2)}{\partial B_{off}}\Delta B_{off}$$

$$\Delta B(f_2) = \frac{\partial B(f_2)}{\partial f_r}\Delta f_r + \frac{\partial B(f_2)}{\partial G_{max}}\Delta G_{max} +$$
$$\frac{\partial B(f_2)}{\partial \Gamma}\Delta\Gamma + \frac{\partial B(f_2)}{\partial \phi}\Delta\phi + \frac{\partial B(f_2)}{\partial G_{off}}\Delta G_{off} + \frac{\partial B(f_2)}{\partial B_{off}}\Delta B_{off}$$

$$\Delta G(f_3) = \frac{\partial G(f_3)}{\partial f_r}\Delta f_r + \frac{\partial G(f_3)}{\partial G_{max}}\Delta G_{max} +$$
$$\frac{\partial G(f_3)}{\partial \Gamma}\Delta\Gamma + \frac{\partial G(f_3)}{\partial \phi}\Delta\phi + \frac{\partial G(f_3)}{\partial G_{off}}\Delta G_{off} + \frac{\partial G(f_3)}{\partial B_{off}}\Delta B_{off}$$

$$\Delta B(f_3) = \frac{\partial B(f_3)}{\partial f_r}\Delta f_r + \frac{\partial B(f_3)}{\partial G_{max}}\Delta G_{max} +$$
$$\frac{\partial B(f_3)}{\partial \Gamma}\Delta\Gamma + \frac{\partial B(f_3)}{\partial \phi}\Delta\phi + \frac{\partial B(f_3)}{\partial G_{off}}\Delta G_{off} + \frac{\partial B(f_3)}{\partial B_{off}}\Delta B_{off}$$

This system of equations is linear and can be solved using matrix factorization methods. It is possible to implement the solution method in an electronic microcontroller to perform the calculations in real time.

Once the model parameters have been updated, it is possible to recalculate the operating frequencies to track the resonant response of the sensor. In this way, if noticeable variations in the sensor resonant frequency occur during the experimental process, the characterization error does not increase as in the case of the fixed-frequency method without tracking. When the three test frequencies are updated, it is necessary to apply a correction coefficient to the experimental measurement of admittance, G and B, before using them in the system of equations described in (16). This coefficient is described in equation 17.

$$\Delta G_{corr} = \Delta G - \frac{\partial G(f_m)}{\partial f}\Delta f = G(f_n)_{t1} - G(f_m)_{t0} - \frac{\partial G(f_m)}{\partial f}\Delta f \quad (17)$$
$$\Delta B_{corr} = \Delta B - \frac{\partial B(f_m)}{\partial f}\Delta f = B(f_n)_{t1} - B(f_m)_{t0} - \frac{\partial B(f_m)}{\partial f}\Delta f$$
$$\Delta f = f_n - f_n$$

Where $f_m$ refers to any of the three test frequencies at instant t0 and $f_n$ refers to any of the three test frequencies at the later instant $t_1$. $\Delta G_{corr}$ and $\Delta B_{corr}$ refer to the measurements of the experimental variation in conductance and susceptance once they have been corrected.

The practical steps defining the characterization method are detailed below:

STAGE 1: Obtain the frequency spectrum of the complex electrical admittance of the acoustic resonator. For example, acquire a certain number of points, for example 100, equispaced in the −3 dB bandwidth around the resonant mode to be analyzed.

STAGE 2: Employ a non-linear mathematical fitting algorithm, e.g. Nelder-Mead Simplex, to fit the experimental data of the admittance spectrum obtained in STAGE 1, associated with the sensor response, to a Lorentzian model and extract the 6 parameters $f_r$, $G_{max}$, $\Gamma$, $\phi$, $G_{off}$, $B_{off}$ that best represent the initial sensor response.

STAGE 3: Select the three test frequencies $f_1$, $f_2$, $f_3$ at which to measure the electrical admittance of the sensor within the bandwidth at −3 dB around the resonant frequency of the mode of interest, i.e., the frequency of maximum conductance $f_{Gmax}$ and the two frequencies on either side of this at which the conductance spectrum attenuates 3 dB.

STAGE 4: Measure the real and imaginary part of the admittance of the sensor at the 3 test frequencies ($f_1$, $f_2$, $f_3$).

STAGE 5: Apply the correction described in equation (17) to the values of G and B measured at the three test frequencies.

STAGE 6: Solve the system of linear equations in (16), and obtain the value of the parameters $f_r$, $G_{max}$, $\Gamma$, $\phi$, $G_{off}$, $B_{off}$.

STAGE 7: Recalculate the value of the test frequencies considering the new value of $f_r$ obtained in STAGE 6.

STAGE 8: Run the process again from STAGE 4 until the experiment is finished.

Steps 1, 2 and 3 of the method, which include the initial numerical adjustment, are only performed once at the beginning of the experiment. Only stages 4, 5, 6, 7 and 8 are performed continuously during the development of the measurement, resulting in a very fast characterization method when compared to methods based on impedance spectrometry or the decay method.

The proposed characterization method has been implemented in a device based on a microcontroller with floating point calculation capability and including the following modules:

a frequency-determined signal source with high frequency stability and low phase noise;

a frequency synthesis subsystem;

a multiplexing subsystem allowing the excitation/interrogation of a specific resonator;

a signal conditioning and acquisition subsystem;

a control subsystem based on the use of digital integrated circuits that allows the coordinated control of the different subsystems that compose the device. Likewise, the control subsystem must be able to calculate the complex admittance of the piezoelectric resonator being interrogated from the data provided by the acquisition subsystem. Finally, it must be able to perform the floating point mathematical operations necessary to implement in real time the calculations described in this paper to compute the dynamic series frequency and dissipation factor.

The proposed characterization method has been validated by comparing the results obtained using the aforementioned device in the monitoring of different experimental processes with the expected theoretical results and/or with a reference method based on impedance spectrometry techniques.

Figure 5:
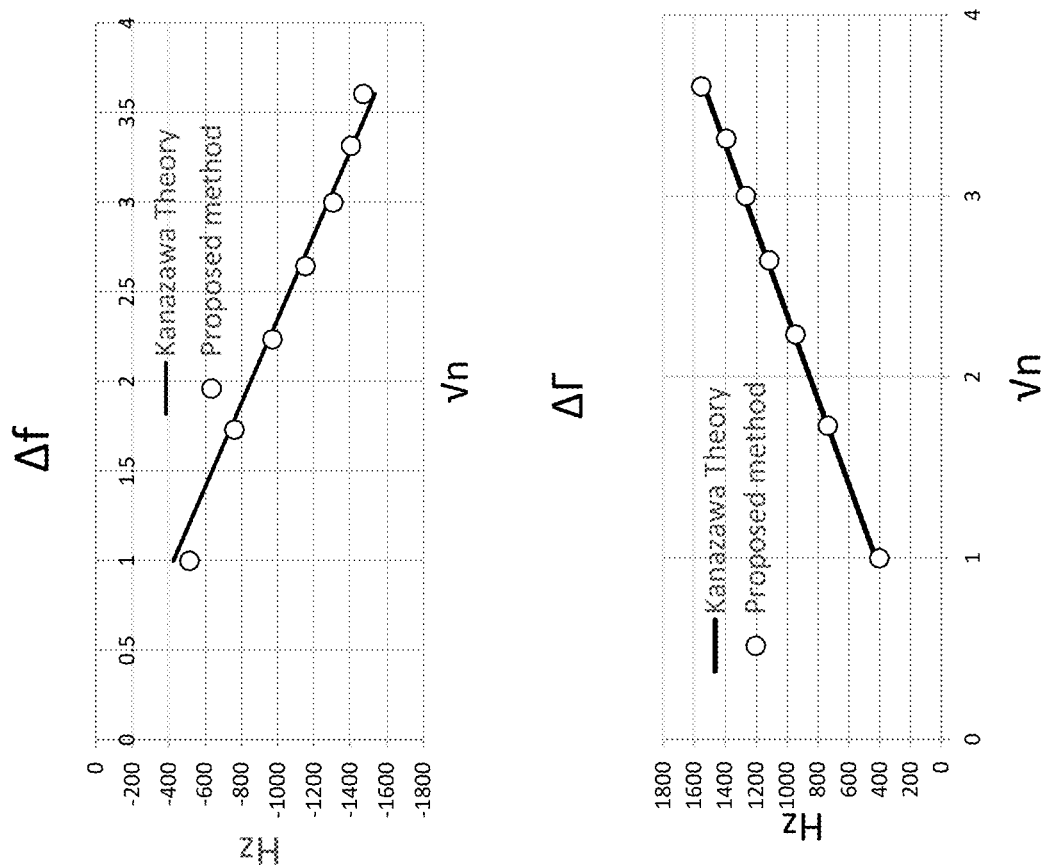
FIG. 5 shows in a graph the variations in the resonance frequency (a) and in the half bandwidth (b) due to a medium change experiment from air to a 25% water-glycerol mixture for different harmonic modes of the sensor, comparing the theoretical results expected by Kanazawa's theory, solid line, with the results obtained by the proposed method, white dots.

One of the experiments carried out consisted of changing the medium in contact with one of the faces of the sensor from air to a 25% solution of glycerol in water. The Kanazawa equation predicts the expected change in both the resonance frequency and the dissipation factor of a sensor subjected to a change of medium as a function of the density and viscosity of the new medium and the frequency of the vibration mode used. FIG. 5) shows the variations in resonant frequency (a) and half bandwidth (b) measured simultaneously for different harmonic modes of the sensor. The proposed method (white dots) agrees with a margin of error smaller than the experimental variance with the results obtained using Kanazawa theory (solid line).

The validity of the method has also been tested with copper electrodeposition experiments.

Figure 3:
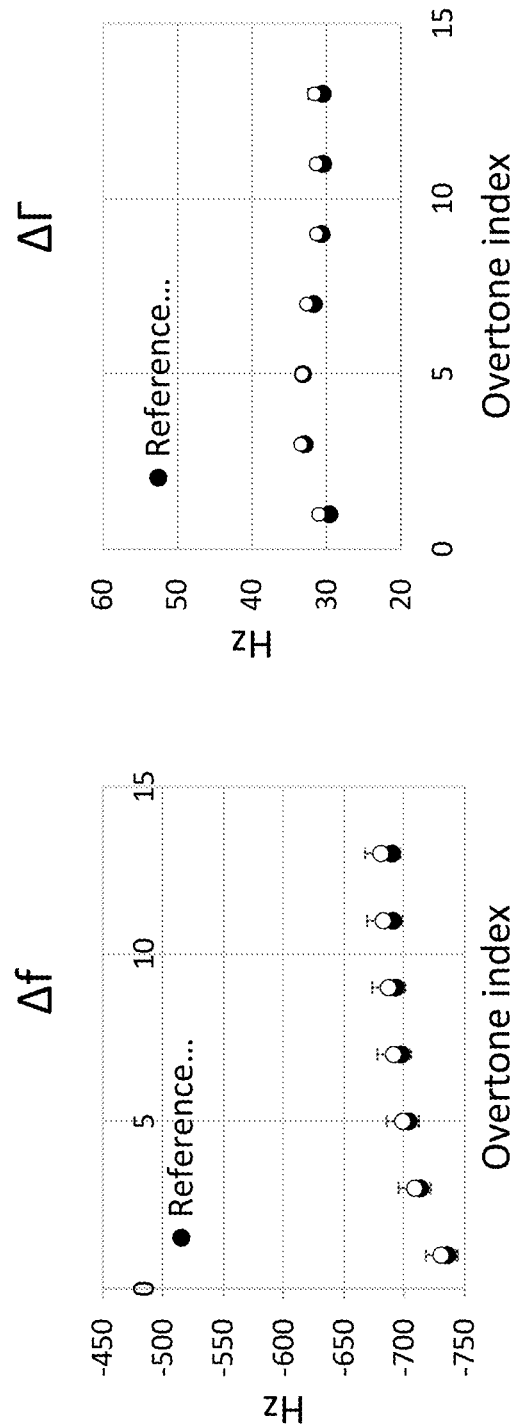
FIG. 3 shows in a graph the maximum variations in the resonance frequency (a) and in the half bandwidth (b) due to a Copper electrodeposition experiment for different harmonic modes of the sensor; the results obtained using the reference method of impedance spectrometry, black points, are compared with the results obtained using the proposed method, white points; in addition, error bars in black are included, FIG. 4 plots the variations in resonant frequency, top, and half-bandwidth, bottom, due to a copper electrodeposition experiment as a function of time for the third harmonic mode of the sensor, comparing the results obtained using the reference impedance spectrometry method, solid line, with the results obtained using the proposed method, dotted line.

FIG. 3 shows the maximum variations in resonant frequency (a) and half bandwidth (b) due to a Copper electrodeposition experiment for different sensor harmonic modes acquired simultaneously. The proposed method, white dots, agrees with an error margin smaller than the experimental variance with the results obtained by the reference method of impedance spectrometry, black dots.

Figure 4:
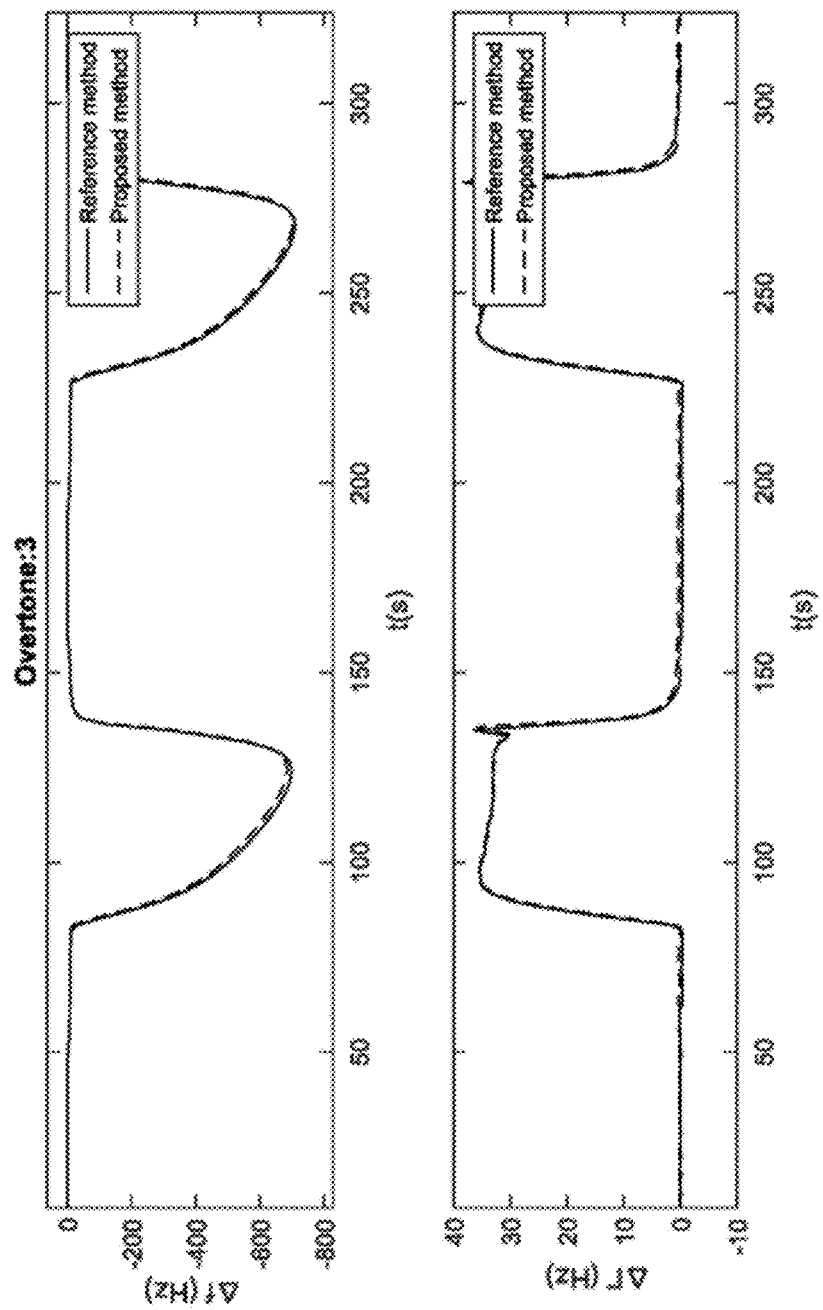

FIG. 4 shows the variations in the resonance frequency, top, and in the half bandwidth, bottom, due to a copper electrodeposition experiment as a function of time and for the third harmonic mode of the sensor. The results obtained using the reference method of impedance spectrometry, solid line, have a dynamic behavior, as a function of time, equal to that of the results obtained using the proposed method, dotted line.

It can be concluded that the proposed characterization method has been successfully validated for a non-limiting variety of experimental conditions ranging from simple changes in mass, copper electrodeposition when dissipation is close to 0, or medium, glycerol solution in 25% water, to changes in the hydrodynamic and/or viscoelastic properties of the coating, copper electrodeposition when there are noticeable changes in dissipation.

The invention claimed is:

1. A method for measuring variations in a resonance frequency and a dissipation factor of a piezoelectric resonator used as a sensor, the resonator being modeled by a Butterworth-Van Dyke (BVD) equivalent circuit and a behavior of the resonator is approximated by the Small Load Approximation (SLA), the method comprising:

(a) measuring an initial complex admittance spectrum of the sensor as a function of frequency, in a vicinity of a resonance frequency of a selected vibration mode of the resonator;

b) fitting, by non-linear numerical methods, the initial complex admittance spectrum of the sensor obtained in step (a) to a Lorentzian model, according to the equations (10) and (11):

$$G(f) = G_{max}\left(\frac{f^2(2\Gamma)^2}{(f_r^2 - f^2)^2 + f^2(2\Gamma)^2}\cos\phi - \frac{f(2\Gamma)(f_r^2 - f^2)}{(f_r^2 - f^2)^2 + f^2(2\Gamma)^2}\sin\phi\right) + G_{off} \quad (10)$$

$$B(f) = G_{max}\left(\frac{f^2(2\Gamma)^2}{(f_r^2 - f^2)^2 + f^2(2\Gamma)^2}\sin\phi + \frac{f(2\Gamma)(f_r^2 - f^2)}{(f_r^2 - f^2)^2 + f^2(2\Gamma)^2}\cos\phi\right) + B_{off} \quad (11)$$

to extract six parameters that characterize the initial response: where, $f_r$: a dynamic series resonance frequency,
$G_{max}$: the maximum conductance,
$G_{off}$: a conductance offset level,
$B_{off}$: an offset level of the susceptance,
$\Gamma$: the half bandwidth of the resonance curve (this parameter is inversely related to the dissipation factor in the sensor),
$\phi$: an angle accounting for the smalls slopes in the resonance curve in the complex plane,
$G(f)$: experimental conductance as a function of frequency, and
$B(f)$: experimental conductance as a function of frequency;

c) determining the values of the BVD equivalent circuit parameters $R_m$, $L_m$, $C_m$, and $C_0$, from the fitted value $f_r$, $G_{max}$, $G_{off}$, $B_{off}$, $\Gamma$, and $\phi$ be obtained in step (b) and from the following equations:

$$R_m = 1/G_{max}, \quad (12)$$

$$L_m = R_m/4\pi\Gamma, \quad (13)$$

$$C_m = 1/4\pi^2 f_r^2 L_m, \quad (14)$$

$$C_0 = B_{off}/2\pi f_r, \quad (15)$$

where,
$R_m$: electrical resistance modelling viscous losses,
$L_m$: inductive parameter proportional to surface mass density,
$C_m$: capacitive parameter proportional to elastic energy stored in the sensor, and
$C_0$: static capacitance of the sensor;

d) selecting a test signal frequency substantially equal to a dynamic series resonance frequency, $f_r$, of the resonator in the initial state of the sensor obtained in step (b), and considering the values of $C_m$ and $C_0$ obtained in step (c) and associated with electrical artifacts outside the sensor itself as invariant during the subsequent experimental characterization;

e) measuring complex admittance values of the sensor at the test signal frequency obtained in step (d);

f) calculating updated values of the dynamic series resonance frequency and the dissipation factor of the sensor from the complex admittance measured in step (e), using the equivalent model parameters obtained in step (c) and the proposed equations (6), (7), (8), and (9):

$$R_m = 1/[G(\omega_r)[1 + (\omega_r C_0 - B(\omega_r))^2/G(\omega_r)^2]] \quad (6)$$

$$L_m = (R_m/\omega_r)[(\omega_r C_0 - B(\omega_r))/G(\omega_r)] + 1/(\omega_r C_m) \quad (7)$$

$$f_r = 1/(2\pi\sqrt{L_m C_m}) \quad (8)$$

$$D = 1/Q = R_m/(2\pi f_r L_m) \quad (9)$$

and f) updating the test frequency to the dynamic series resonance frequency obtained in step (f).

2. The method of claim 1, wherein the initial complex admittance spectrum and the time series of complex admittance spectra are measured for a plurality of harmonic modes of the piezoelectric resonator.

3. A device for measuring variations in the resonance frequency and dissipation factor of a piezoelectric resonator configured to perform the method of claim 1, wherein the device comprises:
- at least one piezoelectric resonator integrated as a resonant sensor on the surface of which a material has been physically or chemically deposited in the form of a thin layer,
- a fluid or gaseous medium in contact with the deposited thin film and whose physical properties are kept constant or not during the chemical or physical process taking place,
- a signal source of a given frequency, with high frequency stability and low phase noise,
- a frequency synthesis subsystem,
- a multiplexing subsystem allowing the excitation/interrogation of a specific resonator,
- a signal condition and acquisition subsystem, and
- a control subsystem based on the use of digital integrated circuits allowing the coordinated control of the different subsystems composing the device and capable of calculating the complex admittance of the piezoelectric resonator from the data provided by the acquisition subsystem and of implementing the necessary mathematical operations in floating point to calculate the dynamic series frequency and the dissipation factor according to the equations described in claim 1.

4. The method of claim 1, wherein steps (e) to (g) are repeated from step (e) until completion of an experimental process.

5. The method of claim 1, further comprising an additional multiplexing stage for interrogating different sensors applied to a device formed by at least two piezoelectric sensors integrated in the form of an array on the same piezoelectric substrate.

6. A method for measuring variations in a resonance frequency and a dissipation factor of a piezoelectric resonator used as a sensor, the resonator being modeled by a BVD equivalent circuit, and a behavior of the resonator approximated by the SLA, the method comprising:
- (a) measuring an initial complex admittance spectrum of the sensor as a function of frequency, in a vicinity of a resonance frequency of a selected vibration mode of the resonator;
- b) fitting, by non-linear numerical methods, the initial complex admittance spectrum of the sensor obtained in step (a) to a Lorentzian model, according to the equations (10) and (11):

$$G(f) = G_{max} \left( \frac{f^2(2\Gamma)^2}{(f_r^2 - f^2)^2 + f^2(2\Gamma)^2} \cos\phi - \frac{f(2\Gamma)(f_r^2 - f^2)}{(f_r^2 - f^2)^2 + f^2(2\Gamma)^2} \sin\phi \right) + G_{off} \quad (10)$$

$$B(f) = G_{max} \left( \frac{f^2(2\Gamma)^2}{(f_r^2 - f^2)^2 + f^2(2\Gamma)^2} \sin\phi + \frac{f(2\Gamma)(f_r^2 - f^2)}{(f_r^2 - f^2)^2 + f^2(2\Gamma)^2} \cos\phi \right) + B_{off} \quad (11)$$

to extract six parameters that characterize the initial response: where,
- $f_r$: a dynamic series resonance frequency,
- $G_{max}$: the maximum conductance,
- $G_{off}$: a conductance offset level,
- $B_{off}$: an offset level of the susceptance,
- $\Gamma$: the half bandwidth of the resonance curve (this parameter is inversely related to the dissipation factor in the sensor),
- $\phi$: an angle accounting for the smalls slopes in the resonance curve in the complex plane,
- $G(f)$: experimental conductance as a function of frequency, and
- $B(f)$: experimental conductance as a function of frequency;
- c) determining the values of the BVD equivalent circuit parameters $R_m$, $L_m$, $C_m$, and $C_0$, from the fitted value $f_r$, $G_{max}$, $G_{off}$, $B_{off}$, $\Gamma$, and $\phi$ obtained in step (b) and from the following equations:

$$R_m = 1/G_{max}, \quad (12)$$

$$L_m = R_m/4\pi\Gamma, \quad (13)$$

$$C_m = 1/4\pi^2 f_r^2 L_m, \quad (14)$$

$$C_0 = B_{off}/2\pi f_r, \quad (15)$$

where,
- $R_m$: electrical resistance modelling viscous losses,
- $L_m$: inductive parameter proportional to surface mass density,
- $C_m$: capacitive parameter proportional to elastic energy stored in the sensor, and
- $C_0$: static capacitance of the sensor;
- d) selecting three test frequencies $f_1$, $f_2$, and $f_3$ within the −3 dB bandwidth surrounding the resonance frequency of the mode of interest, comprising the frequency $f_{Gmax}$ corresponding to the maximum conductance, and the two frequencies on either side of $f_{Gmax}$ at which the conductance is reduced by 3 dB;
- e) measuring real and imaginary part of the admittance of the sensor at the three test frequencies ($f_1$, $f_2$, $f_3$);
- f) applying the following correction to the values of G and B measured at the three test frequencies ($f_1$, $f_2$, $f_3$):

$$\Delta G_{corr} = \Delta G - \frac{\partial G(f_m)}{\partial f}\Delta f = G(f_n)_{t1} - G(f_m)_{t0} - \frac{\partial G(f_m)}{\partial f}\Delta f \quad (17)$$

$$\Delta B_{corr} = \Delta B - \frac{\partial B(f_m)}{\partial f}\Delta f = B(f_n)_{t1} - B(f_m)_{t0} - \frac{\partial B(f_m)}{\partial f}\Delta f$$

$$\Delta f = f_n - f_m$$

- g) solving the following system of linear equations, and obtaining the value of the parameters $f_r$, $G_{max}$, $G_{off}$, $B_{off}$, $\Gamma$, and $\phi$:

$$\Delta G(f_1) = \frac{\partial G(f_1)}{\partial f_r}\Delta f_r + \frac{\partial G(f_1)}{\partial G_{max}}\Delta G_{max} + \quad (16)$$
$$\frac{\partial G(f_1)}{\partial \Gamma}\Delta\Gamma + \frac{\partial G(f_1)}{\partial \phi}\Delta\phi + \frac{\partial G(f_1)}{\partial G_{off}}\Delta G_{off} + \frac{\partial G(f_1)}{\partial B_{off}}\Delta B_{off}$$

$$\Delta B(f_1) = \frac{\partial B(f_1)}{\partial f_r}\Delta f_r + \frac{\partial B(f_1)}{\partial G_{max}}\Delta G_{max} +$$
$$\frac{\partial B(f_1)}{\partial \Gamma}\Delta\Gamma + \frac{\partial B(f_1)}{\partial \phi}\Delta\phi + \frac{\partial B(f_1)}{\partial G_{off}}\Delta G_{off} + \frac{\partial B(f_1)}{\partial B_{off}}\Delta B_{off}$$

$$\Delta G(f_2) = \frac{\partial G(f_2)}{\partial f_r}\Delta f_r + \frac{\partial G(f_2)}{\partial G_{max}}\Delta G_{max} +$$

-continued $$\Delta B(f_2) = \frac{\partial B(f_2)}{\partial f_r}\Delta f_r + \frac{\partial B(f_2)}{\partial G_{max}}\Delta G_{max} +$$
$$\frac{\partial B(f_2)}{\partial \Gamma}\Delta\Gamma + \frac{\partial B(f_2)}{\partial \phi}\Delta\phi + \frac{\partial B(f_2)}{\partial G_{off}}\Delta G_{off} + \frac{\partial B(f_2)}{\partial B_{off}}\Delta B_{off}$$

$$\Delta G(f_3) = \frac{\partial G(f_3)}{\partial f_r}\Delta f_r + \frac{\partial G(f_3)}{\partial G_{max}}\Delta G_{max} +$$
$$\frac{\partial G(f_3)}{\partial \Gamma}\Delta\Gamma + \frac{\partial G(f_3)}{\partial \phi}\Delta\phi + \frac{\partial G(f_3)}{\partial G_{off}}\Delta G_{off} + \frac{\partial G(f_3)}{\partial B_{off}}\Delta B_{off}$$

$$\Delta B(f_3) = \frac{\partial B(f_3)}{\partial f_r}\Delta f_r + \frac{\partial B(f_3)}{\partial G_{max}}\Delta G_{max} +$$
$$\frac{\partial B(f_3)}{\partial \Gamma}\Delta\Gamma + \frac{\partial B(f_3)}{\partial \phi}\Delta\phi + \frac{\partial B(f_3)}{\partial G_{off}}\Delta G_{off} + \frac{\partial B(f_3)}{\partial B_{off}}\Delta B_{off}$$

h) recalculating the value of the test frequencies considering the new value of $f_r$ obtained in step (g) and the conditions described in step (c).

7. The method of claim 6, wherein the initial complex admittance spectrum and the time series of complex admittance spectra are measured for a plurality of harmonic modes of the piezoelectric resonator.

8. The method of claim 6, comprising an additional multiplexing stage allowing to interrogate different sensors applied to a device formed by at least two piezoelectric sensors integrated in the form of an array on a same piezoelectric substrate.

9. A device for measuring variations in the resonance frequency and dissipation factor of a piezoelectric resonator configured to perform the method of claim 6, wherein the device comprises:
- at least one piezoelectric resonator integrated as a resonant sensor on the surface of which a material has been physically or chemically deposited in the form of a thin layer,
- a fluid of gaseous medium in contact with the deposited thin film and whose physical properties are kept constant or not during the chemical or physical process taking place,
- a signal source of a given frequency, with high frequency stability and low phase noise,
- a frequency synthesis subsystem,
- a multiplexing subsystem allowing the excitation/interrogation of a specific resonator,
- a signal conditioning and acquisition subsystem, and
- a control subsystem based on the use of digital integrated circuits allowing the coordinated control of the different subsystems composing the device and capable of calculating the complex admittance of the piezoelectric resonator from the data provided by the acquisition subsystem and of implementing the necessary mathematical operations in floating point to calculate the dynamic series frequency and the dissipation factor according to the equations described in claim 6.

10. The method of claim 6, wherein the calculations are iterated from step (d) until an experimental process characterized by the described technique is finished.

\* \* \* \* \*